United States Patent [19]

Prener

[11] Patent Number: 5,125,092

[45] Date of Patent: Jun. 23, 1992

[54] METHOD AND APPARATUS FOR PROVIDING MULTIPLE CONDITION CODE FIELDS TO TO ALLOW PIPELINED INSTRUCTIONS CONTENTION FREE ACCESS TO SEPARATE CONDITION CODES

[75] Inventor: Daniel A. Prener, Croton, N.Y.

[73] Assignee: International Business Machines Corporation, Armonk, N.Y.

[21] Appl. No.: 294,850

[22] Filed: Jan. 9, 1989

[51] Int. Cl.⁵ ............................................. G06F 9/312
[52] U.S. Cl. .................................. 395/725; 395/775; 364/DIG. 1; 364/247.3; 364/231.8; 364/242.6
[58] Field of Search ... 364/200 MS File, 900 MS File

[56] References Cited

U.S. PATENT DOCUMENTS

| | | | |
|---|---|---|---|
| 4,136,383 | 1/1979 | Takesue | 364/200 |
| 4,348,721 | 9/1982 | Brereton et al. | 364/200 |
| 4,370,710 | 1/1983 | Kroft | 364/200 |
| 4,532,589 | 7/1985 | Shintani et al. | 364/200 |
| 4,748,585 | 5/1988 | Chiarutli et al. | 364/900 |
| 4,766,566 | 8/1988 | Chuang | 364/900 |
| 4,809,169 | 2/1989 | Sfarti et al. | 364/200 |
| 4,847,755 | 7/1989 | Morrison et al. | 364/200 |
| 4,980,850 | 12/1990 | Morgan | 364/900 |
| 4,989,130 | 1/1991 | Moriyama et al. | 364/200 |
| 4,994,964 | 2/1991 | Wolfberg et al. | 364/408 |

OTHER PUBLICATIONS

Agerwala, T. K. M. "New Condition Code and Branch Architecture for High Performance Processors," IBM Tech. Disclosure Bulletin, vol. 25, No. 1, Jun. 1982, 136–137.

Improved Condition Code and Branch Handling for Model 91-Like Implementation of the IBM System/370 Architecture by T. K. M. Agerwala (pp. 134, 135).

Primary Examiner—Thomas C. Lee
Assistant Examiner—Richard Lee Ellis
Attorney, Agent, or Firm—Ratner & Prestia

[57] ABSTRACT

A computer system includes a condition register having multiple fields. Each field may be used as an independent condition register. A compiler which generates executable code for the computer system assigns instructions to different fields, allowing condition values to be saved while other conditions are evaluated and allowing consecutive instructions which generate or test condition values to be overlapped in their execution.

8 Claims, 4 Drawing Sheets

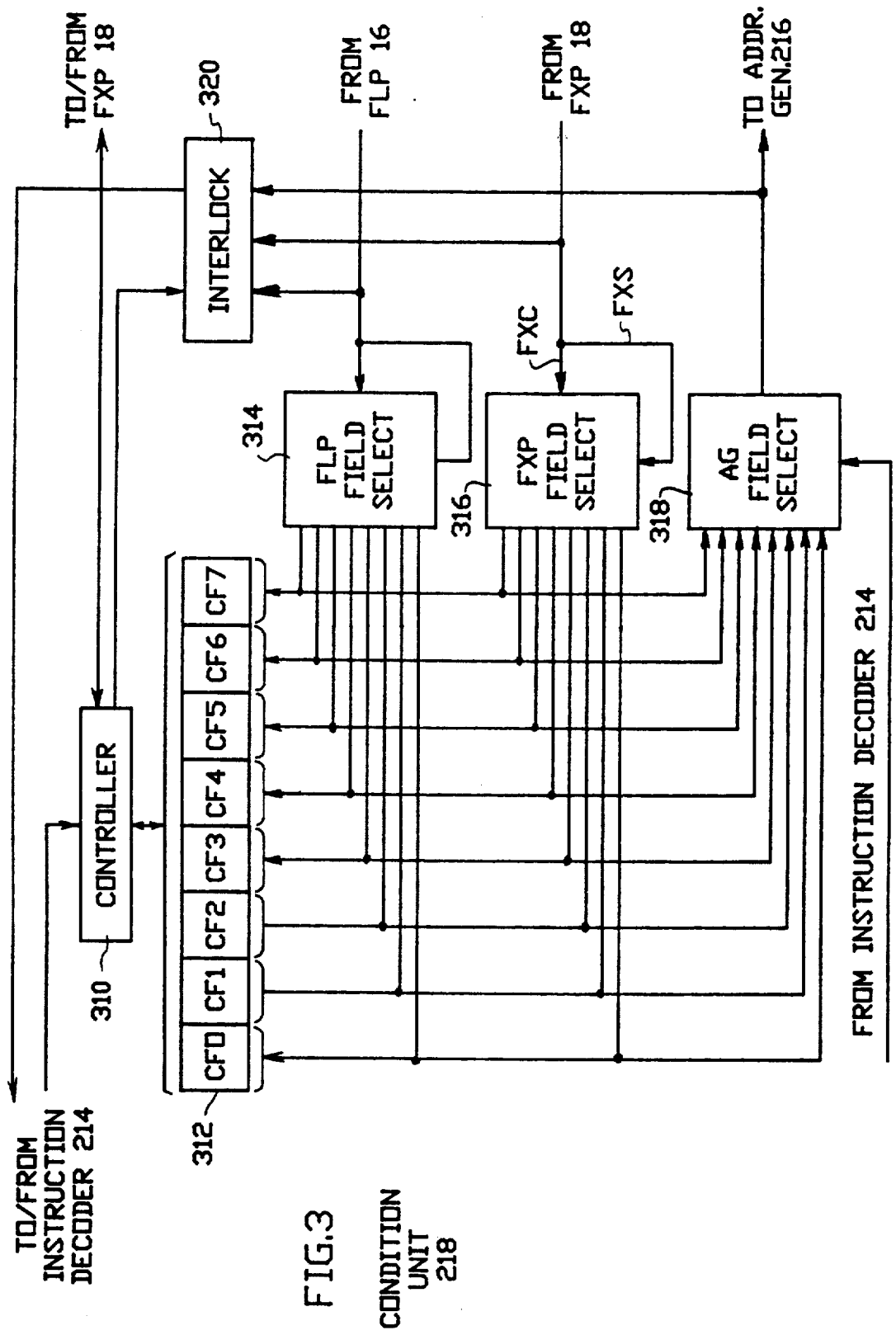
FIG.3 CONDITION UNIT 218

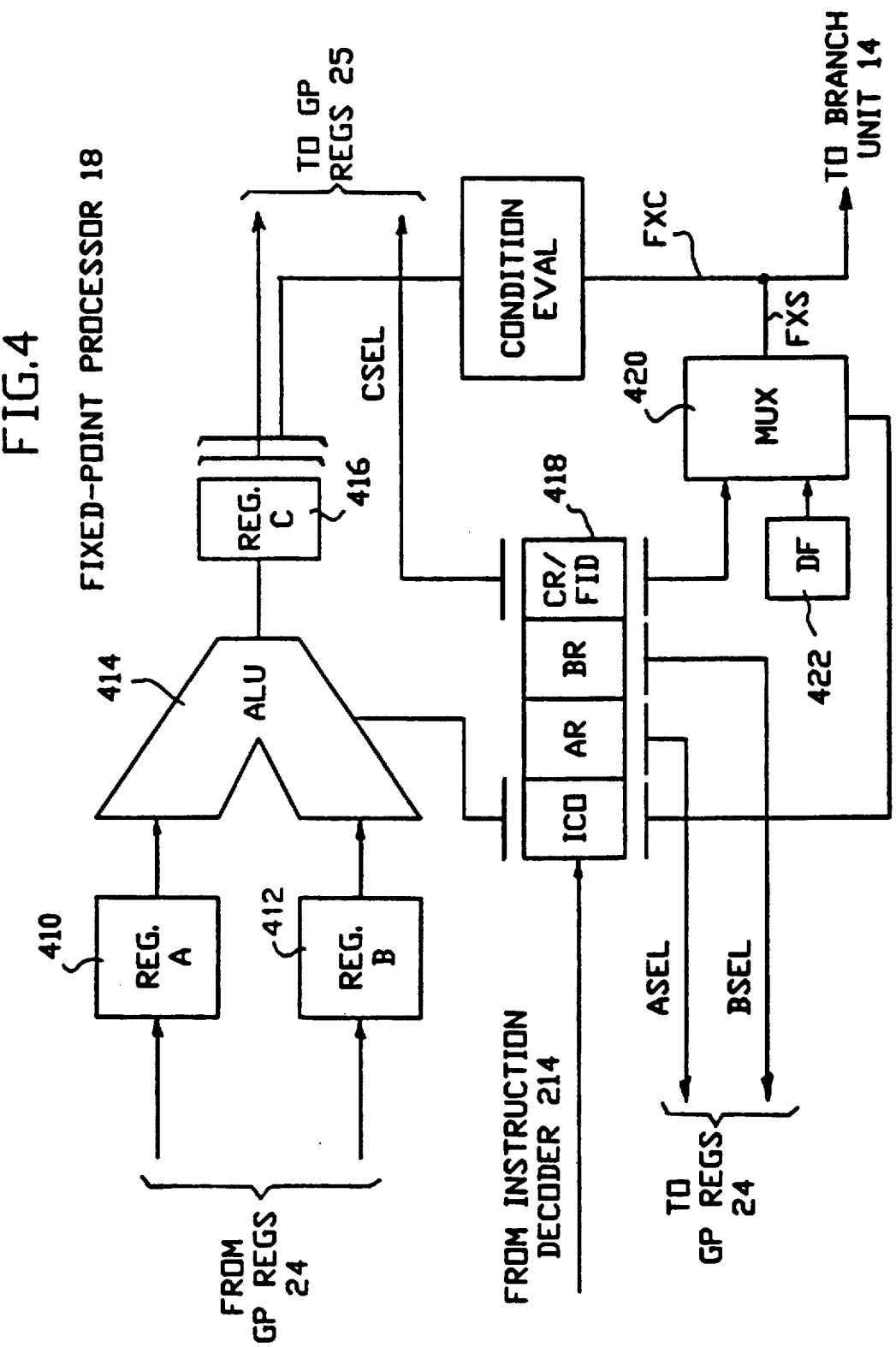

METHOD AND APPARATUS FOR PROVIDING MULTIPLE CONDITION CODE FIELDS TO TO ALLOW PIPELINED INSTRUCTIONS CONTENTION FREE ACCESS TO SEPARATE CONDITION CODES

BACKGROUND OF THE INVENTION

1. Field of the Invention

The present invention relates generally to the design of parallel-pipelined data processing equipment and in particular to an apparatus and a method for handling conditional relationships among data items being processed thereby.

2. Description of the Prior Art

A condition register is used in a data processor to record when certain conditional relationships exist in the data being processed. For example, that the value of a data item stored in a first register is greater than that of a data item stored in a second register. Programs being executed by the processor commonly use conditional branch instructions which change the control flow of the programs based on the conditional relationships recorded in a condition register.

In a conditional branch instruction, the processor is instructed to execute a first sequence of instructions if a certain condition is met by the data and to execute a second sequence of instructions if the condition is not met. For example, given two registers A and B, a conditional branch instruction may cause the processor to execute one sequence of instructions if the value held in A is greater than that held in B, and another sequence of instructions otherwise.

In most high performance processors, the existence of a condition is tested by an arithmetic and logic unit (ALU) and the result of the test is stored in a condition register. A program sequencing unit then uses the result in the condition register to change the instruction control flow through the processor as defined by the program being executed. Generally, each processor in a data processing system includes only one condition register, which is not shared with any other processor.

This condition register may be a significant bottleneck in a computer system which is generally able to overlap the execution of multiple instructions. This bottleneck occurs in a pipeline processor when successive instructions need to access the one condition register for conflicting purposes. For example, consider the following set of instructions.

```
COMPARE (A, B)
BRANCH IF EQUAL
COMPARE (C, D)
BRANCH IF GREATER
```

The first instruction compares the contents of the registers A and B and sets individual bits in the condition register if A is greater than, equal to, or less than B, respectively. The second instruction changes the control flow of the program (i.e. branches to a new instruction) if the result of the comparison is that the values held in the registers A and B are equal. The third instruction compares the contents of the registers C and D and stores the results of the comparison in the same condition register. Finally, the fourth instruction branches to a new instruction if the greater-than bit is set in the condition register.

In a conventional pipeline processor, which uses only one condition register, it would not be desirable to overlap the execution of the second and third instructions. If this were done, however, the third instruction may change the value in the condition register before the second instruction has completed the branch operation based on the condition value determined by the first instruction.

In many conventional processor designs, separate processing elements are used for fixed-point (i.e. integer) and floating-point (i.e. real) arithmetic. If these processors use a common condition register, the processor should desirably include some mechanism for temporarily suspending one of the processors if it attempts to access the condition register concurrently with the other processor. Alternatively, if each of these processors includes a dedicated condition register, it may be necessary to carefully synchronize the two processors when a conditional branch operation is based on conditions occurring in both processors.

U.S. Pat. No. 4,136,383 to Takesue relates to a data processing system in which a number of ALU's are used in a parallel configuration for concurrent data processing. Each ALU includes circuitry which tests for conditions and a register which holds the test results. The test results for each ALU are channeled to a common control circuit which determines the instruction flow for all of the ALUs.

U.S. Pat. No. 4,748,585 to Chiarulli et al. relates to a processor which includes a plurality of bit-slice sub-processors. While all sub-processors operate in lock-step, each sub-processor is assigned a separate set of operands, a separate operations code and a separate condition code mask. Consequently, the bit-slice sub-processors may be configured in groups where each group performs a different sequence of instructions. Conditional branching for all of the processors is controlled by a combination of condition values generated by all of the processors.

Two articles by T. K. M. Agerwala in the IBM Technical Disclosure Bulletin Vol. 25 No. 1, June 1982 pp 134–137, relate to a reduced instruction set computer (RISC) system which includes separate fixed-point and floating-point processing elements. Both processing elements are sequenced by a common controller. Each processing element has its own internal condition register. Preliminary branch decisions are made by each processor based on the values in these registers. These preliminary decisions may then be combined by a central branch processing unit to generate the final branch decision.

SUMMARY OF THE INVENTION

It is an object of the present invention to provide apparatus which allows for the overlap of instructions which access condition values in a pipelined computer system or in a parallel computer system.

It is a further object of the present invention to provide a mechanism for readily combining the condition values generated in a computer system by a plurality of instructions to form a further condition value which may be used to control the sequence of instructions executed by the computer system.

The present invention is embodied in a computer system which includes means for storing multiple condition values. Each instruction which may set or read a condition value may be individually associated with one of the condition values, so that it sets or reads that one value exclusive of any other value.

According to a further embodiment of the invention, the computer system includes a facility for combining a plurality of the condition values to generate a further condition value.

In another embodiment of the invention, the computer system includes multiple processing stages, each of which is coupled to set and read the condition values. The computer system includes a common instruction sequencing unit for all of the processing stages and a facility for controlling the sequence of instructions executed by each processor in response to any of the condition values.

In yet another embodiment of the invention, the computer system includes a pipelined processor and control circuitry which overlaps the execution of condition evaluation instructions and branch on condition instructions.

BRIEF DESCRIPTION OF THE DRAWINGS

FIG. 3 is a block diagram of condition unit circuitry suitable for use in the branch unit circuitry shown in FIG. 2.

FIG. 4 is a block diagram of a fixed-point processor suitable for use in the computer system shown in FIG. 1.

DETAILED DESCRIPTION OF THE PREFERRED EMBODIMENT OF THE INVENTION

Figure 1:
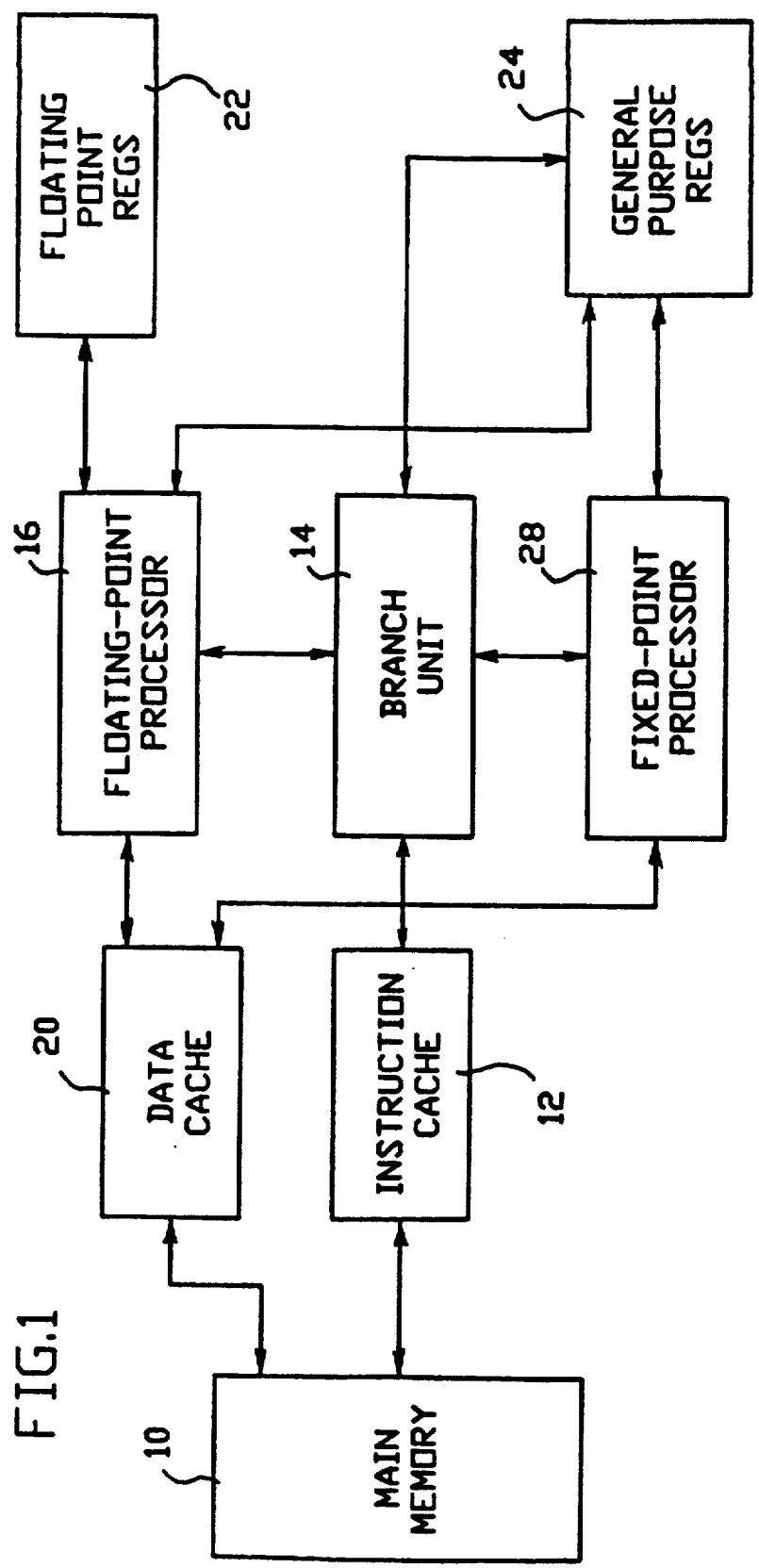
FIG. 1 is a block diagram of a parallel-pipelined computer system which includes an embodiment of the present invention.

FIG. 1 is a block diagram of a data processing system which includes an embodiment of the present invention. This system is a RISC-type which includes separate floating-point and fixed-point processors, 16 and 18. Both of these processors are controlled by a branch unit 14. The floating-point processor 16 operates on data held in a floating-point register file 22 and in a general purpose register file 24. The fixed-point processor 18 operates on data held in the general in FIG. 1 also includes a main storage area 10, a data cache memory 20 and an instruction cache memory 12.

In general terms, the system operates as follows. The branch unit 14 fetches instructions from the main memory 10 via the instruction cache 12. The branch unit 14 then divides these instructions between the floating-point processor 16 and the fixed-point processor 18. Except for fetch and store instructions, the processors 16 and 18 operate only on data stored in the floating-point register file 22 and in the general purpose register file 24. For fetch and store instructions, the processors 16 and 18 transfer data between the memory 10 and the respective register files 22 and 24 via the data cache 20.

As set forth in more detail below, the branch unit 14, used in this embodiment of the invention, includes a condition register that has eight fields. A software compiler which generates executable code for the processor shown in FIG. 1, may, for example, assign a particular compare instruction, and its corresponding test instruction, to a particular field in the condition register. A subsequent compare and test instruction pair may be assigned to a different field, allowing the compare instruction of the second pair to be executed at the same time as the test instruction of the first pair. Fields in the condition register may also be assigned to an instruction based on whether the instruction is to be executed by the floating-point processor 16 or the fixed-point processor 18.

Figure 2:
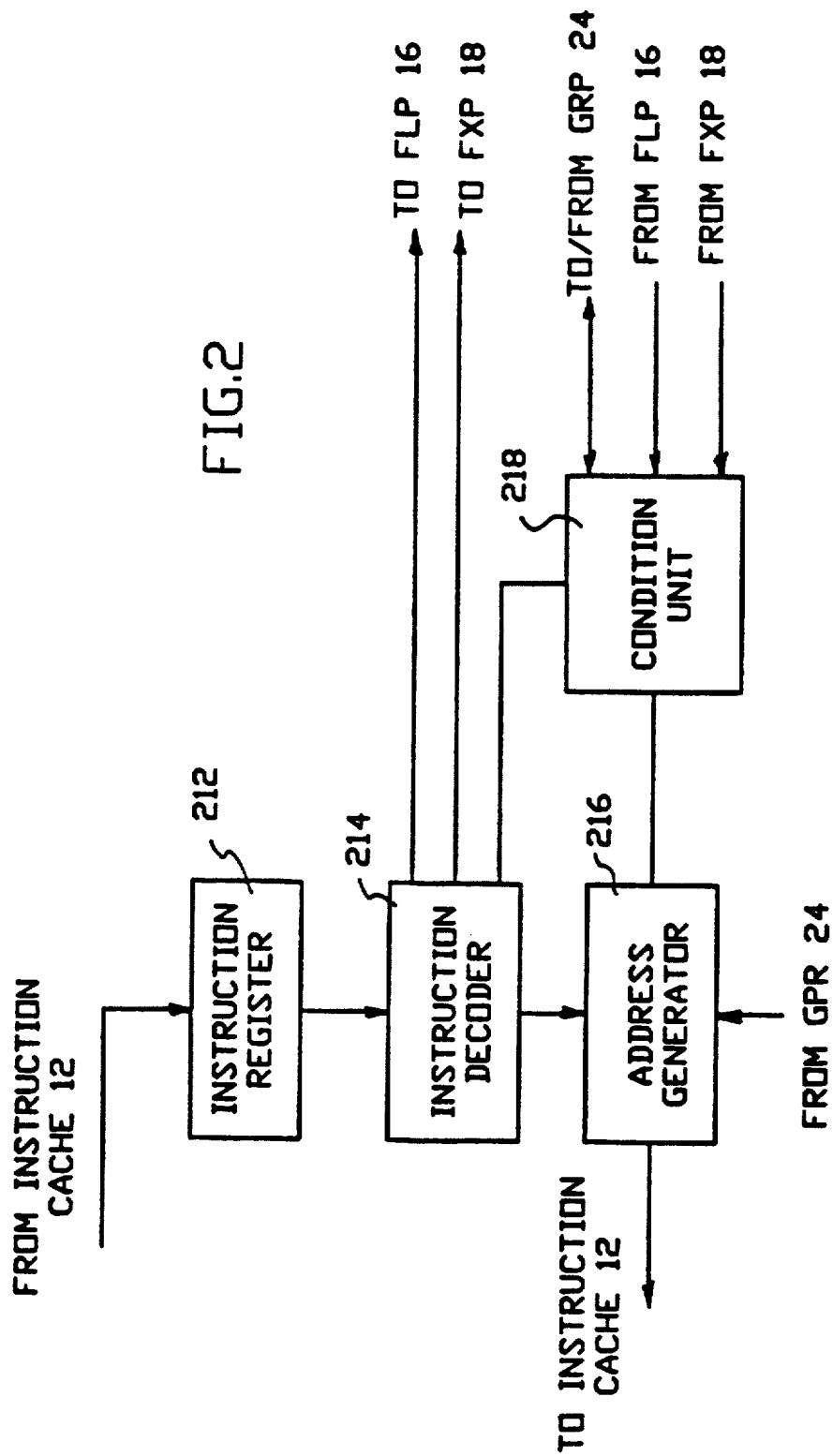
FIG. 2 is a block diagram of branch unit circuitry suitable for use in the computer system shown in FIG. 1.

The control function for the processing system shown in FIG. 1 is provided by the branch unit 14. FIG. 2 is a block diagram of circuitry suitable for use as the branch unit 14. In FIG. 2, instructions from the cache 12 are applied to an instruction register 212. These instructions are decoded by an instruction decoder 214 which, itself, generates instructions for the floating-point processor (FLP) 16, the fixed-point processor (FXP) 18, a condition unit 218 and an address generator 216. In addition, the branch unit 14 has direct access to the general purpose registers 24 to save and restore copies of a condition register such as a register 312 described below in reference to FIG. 3. This connection allows the processor to save the state of the condition register across, for example, a call on a subroutine generated by an interrupt event.

The cache 12 contains several instructions which sequentially follow the one applied to the instruction register 212. As an instruction is being processed by the instruction decoder 214, the next successive instruction is applied to the instruction register 212. If there are no conflicts between them in the use of hardware resources, the decoder 214 may decode two successive instructions in one instruction cycle.

The instruction decoder 214, which is of conventional design, may be implemented by a preprogrammed read-only memory (not shown). The instruction decoder 214 provides floating-point instructions to the floating-point processor 16, fixed-point instructions to the fixed-point processor 18, branch instructions to the condition unit 218 and address generator 216 and load and store instructions to both the floating-point registers 22 and the general purpose registers 24. However, the instruction decoding operation is more than a simple routing of fixed-point instructions to the fixed-point processor and floating-point instructions to the floating-point processor. The instruction decoder may, for example, divide out the address calculation portion of a floating-point data load instruction for execution on the fixed-point processor and then provide the result to the floating-point processor 16, which loads the data from the data cache 20 to the floating-point register file 22.

The address generator 216, which is of conventional design, provides address values to the instruction cache 12 to condition the cache to provide instructions to the instruction register 212. The generator 216 includes circuitry (not shown) to increment the address of the current instruction, during sequential instruction execution. The address generator also includes circuitry such as a multiplexer (not shown) which selects either the incremented current instruction address or a branch instruction address value provided, for example, from the general purpose register file 24 based on the value of a condition provided by the condition unit 218. Branch instruction address values may also be provided by the instruction decoder 214 from the current instruction.

The condition value supplied by the condition unit 218 may include, for example, three bits, one each for a comparison result greater-than, less-than and equal-to. The branch instruction typically includes a mask which is logically ANDed, in the address generator 216, with the applied condition value. The individual bits of the result of this operation are then logically ORed by circuitry internal to the address generator 216. The output signal of this circuitry conditions the multiplexer to provide either the next sequential instruction address value or the branch address value to the instruction cache 12. This circuitry allows branch conditions such as $A \geq B$ or $A \neq B$ to be implemented.

As set forth above, the condition unit 218 provides a condition value to the address generator 216. FIG. 3 is a block diagram of circuitry suitable for use as the condition unit 218. The condition unit circuitry shown in FIG. 3 includes a condition register 312, a controller 310 which implements instructions that act on the contents of the condition register 312, two field select demultiplexers, 314 and 316, a field select multiplexer 318; and an interlock detector 320.

The register 312 includes eight condition fields, condition field 0 (CFO) through condition field 7 (CF7). These fields represent eight distinct condition registers, each independently capable of receiving the result of a compare instruction, and of being tested by a conditional branch instruction. The field select demultiplexers, loating point (FLP) field select 314 and fixed point (FXP) field select 316 each choose one field of the register to receive a condition value from the floating-point processor 16 and from the fixed-point processor 18, respectively. The field select multiplexer 318 chooses one of the eight fields of the register 312 to provide a condition value to the address generator 216. The fields chosen by the demultiplexers 314 and 316 are determined by the instructions being executed by the respective floating-point and fixed-point processors. The field chosen by the multiplexer 318 is determined by the instruction decoder 214.

The controller 310 allows the processing system, through the instruction decoder, to manipulate various fields of the condition register 312 and to save and recall the entire contents of the register 312. The controller 310 may, for example, include conventional logic circuitry (not shown) to form the logical AND or logical OR of multiple condition fields and circuitry (not shown) to store the logical combination in one of the condition fields. This circuitry facilitates the evaluation of a complex condition such as $A<B$ AND $C>D$.

If more than one of the controller 310, floating-point processor 16, fixed-point processor 18, and instruction decoder 214 select the same field of the register 312 during a single instruction cycle, the computations performed in response to the condition value may be erroneous. Errors may occur, for example, when the condition value is simultaneously set by a compare instruction of one of the processors 16 and 18 and read by a branch instruction of the address generator 216. In this instance, the condition value may be set before, during or after the branch instruction has tested its value.

To prevent this type of error, the condition unit shown in FIG. 3 includes interlock circuitry 320. This circuitry allows only one of the controller 310, field select multiplexer 318 and field select demultiplexers 314 and 316 to access any one field of the register 312 during any one instruction cycle. If a second one of these devices attempts to access a field that is being accessed by a first device, the interlock circuitry 320 signals the instruction decoder 214 to suspend the instruction which is causing the conflict. Stated another way, when the interlock circuitry 320 detects a potentially conflicting access of any one field of the register 312, it forces the instruction decoder to operate the system as a serial processor rather than as a pipeline processor.

The floating-point processor 16 and the fixed-point processor 18 evaluate compare instructions in substantially the same manner. Consequently, only the fixed-point processor 18 is described below. FIG. 4 is a block diagram of circuitry suitable for use as the fixed-point processor 18. Circuitry for accessing memory data via in the data cache 20 is omitted from FIG. 4 for the sake of brevity. In FIG. 4, a conventional arithmetic and logic unit (ALU) 414 receives input operands A and B from respective registers 410 and 412, and provides an output result C to a register 416. The function performed by the ALU 414 and the addresses in the register file 24 for the result C and the operands A and B are all provided by an instruction word held in an instruction register 418. This instruction word is supplied by the instruction decoder 214 as set forth above.

An instruction word includes four fields. The first field, instruction code (ICD), contains an instruction code. A portion of this field is applied as a control value to the ALU 414. This control value determines the operation performed by the ALU, for example; $A+B$ $A-B$, or A AND B. The second and third fields, a Register (AR) and B Register (BR) identify individual registers in the general purpose register file 24 which hold the respective operands A and B. The fourth field, C Register/Field Identification (CR/FID), identifies the general purpose register designated to receive the result produced by the ALU 414 or, for compare instructions, it identifies which field of the condition register 312 is to receive the result of the comparison.

A compare instruction; for example, COMPARE A, B; is evaluated by the fixed-point processor as follows. The operands A and B are loaded into the respective registers 410 and 412 and a control value indicating substraction is applied to the ALU 414. Responsive to this control value, the ALU 414 applies a value representing $A-B$ to the register 416. This value is, in turn, applied to condition evaluation circuitry (CONDITION EVAL 424). The circuitry 424 may, for example, set the less-than bit of the condition value if the result, C, is negative, set the equal-to bit if C is zero, or set the greater-than bit if C is non-zero and positive. The condition value provided by the circuitry 424 is concatenated to a condition field identifier, provided from the fourth field of the instruction register 418 via a multiplexer 420, and the combined value is applied to the field select demultiplexer 316 of the branch unit 14.

The multiplexer 420 is also coupled to provide a default field value, DF, from a digital value source 422 as the condition field identifier. This value is provided when an instruction such as ADD AND COMPARE is evaluated. Instructions of this type produce both a result for storage into a general purpose register and a condition value indicating whether the result is less-than, equal-to or greater-than zero. For these instructions, the field CR/FID indicates the general purpose register designated to hold the result of the ADD operation. The condition field identifier DF is a default field identifier for the processor 18. It is the same for all instructions which do not designate a condition field. Moreover, to reduce the possibility of conflicts in the use of a condition field, the default field value is desirably different from any field value that may be assigned to an instruction by the software compiler. The floating-point processor 16 includes circuitry substantially identical to the digital value source 422 and multiplexer 420. However, the default field identifier provided by the floating-point processor 16 is desirably different than that provided by the source 422.

The following segment of a computer program is presented to illustrate the operation of the processing system shown in FIGS. 1-4. In this example, the instruction code field is represented by a mnemonic and the second, third and fourth fields of the instruction, where appropriate, follow the mnemonic and are separated by commas. The example assumes that a general purpose register A in the register file 24 contains a value of −1, that two floating-point registers C and D in the register file 22 contain values of 1.5 and 2.0 and that two general purpose registers E and F contain branch address values.

```
COMPARE C, D, CF0
BRANCH EQUAL E, CF0
ADD AND COMPARE A, 1, B
BRANCH EQUAL F, CF1
```

In executing this program segment, the instruction decoder 214 applies the first instruction to the floating-point unit 16 during a first instruction cycle. Responsive to this instruction, the unit 16 compares the two floating-point values held in the registers C and D and stores the compare value in field CF0 of the condition register 312. In a second instruction cycle, the instruction decoder applies the second instruction to the address generator 216 and to the condition unit 218. In response to this instruction, the condition unit 218 provides the condition value held in the field CF0 to the address generator 216 and the address generator 216 accesses the branch address value held in the general purpose register E. Since C and D are not equal, the branch is not taken and so, the address generator 216 provides the next sequential address to the instruction cache 12.

In anticipation that the branch in the second instruction would not be taken, the instruction decoder 214 applies the third instruction to the fixed-point processor 18 during the same instruction cycle that it applies the second instruction to the address generator 216 and condition unit 218. Responsive to this third instruction, the fixed-point processor 18 adds a literal 1 (from the second field of the instruction) to the −1 value held in the register A and stores the result in the register B. By convention known to the compiler, the default condition field for the fixed-point processor 18, in this example, is CF1. Accordingly, the condition value produced by the third instruction—comparing the result of the addition operation to 0— is stored in the CF1 field of the condition register.

In the third instruction cycle, the fourth instruction is applied to the address generator 216 and condition unit 218. In response to this instruction, the condition unit 218 provides the condition value in the field CF1 to the address unit and the address unit accesses the branch address value held in the register F. In this instance, since the equal bit of the condition value is set, the branch is taken and the address generator 216 provides the branch address value from the general purpose register F to the instruction cache 12.

While the embodiment of the invention described above is in terms of a RISC type system, it is contemplated that the invention may also be implemented in a conventional parallel or pipelined complex instruction set computer (CISC) system. In addition, while the various condition fields are described above as being contained in a single register, it is contemplated that they may be contained in separate registers and may be distributed among the processing elements of the computer system. In addition, those skilled in the art will recognize that the invention can be practiced with modification and alteration within the spirit and scope of the appended claims.

The invention claimed is:

1. A computer implemented method for using condition values indicating the existence of predetermined relationships among respective data items accessible to a computer system wherein said computer system manipulates the data items via instructions of a first type which generate said condition values and wherein said computer system tests said generated condition values via instructions of a second type each corresponding to a respective one of the instructions of the first type, said method comprising the steps of:

A. allocating a plurality of condition value fields in the computer system;

B. assigning successive ones of said instructions of said first type to store the generated condition values in respectively different ones of said plurality of condition value fields; and C. assigning each of said instructions of said second type to test the condition values held in the condition value fields assigned to the respective one of the instructions of the first type;

D. evaluating, at run time, said instructions of said first type and said instructions of said second type to prevent contention among any of said evaluated instructions which are attempting to access any one of said plurality of condition value fields.

2. The method set forth in claim 1 further comprising the steps of:

D. reading first and second condition values from respective first and second ones of said condition value fields;

E. combining said first and second condition values to produce a third condition value; and F. storing said third condition value in one of said plurality of condition value fields.

3. The method set forth in claim 1 wherein said computer system includes first and second processing stages each of which may execute instructions of said first and second type and wherein:

said step B includes the step of assigning selected ones of said instructions of said first type, which are executed on said first processing stage, to set condition values in a first one of said condition value fields; and said step C includes the step of enabling the instructions of said second type which correspond to said selected instructions of said first type to test condition values in said first one of said condition value fields.

4. The method set forth in claim 1 wherein the computer system includes a pipelined processor which executes a sequence of instructions including an instruction of said second type followed immediately by an instruction of said first type, wherein:

said step B includes the steps of:

enabling said instruction of said second type to test a condition value in a first one of said condition value fields; and enabling said instruction of said first type to set a condition value in a second one of said condition value fields; and said method further includes the step of overlapping the execution of the instructions of first and second type.

5. In a computer system for processing data items including means for processing instructions of a first type which produce condition values based on the values of selected ones of said data items and means for processing instructions of a second type which test said condition values, condition handling apparatus comprising:

condition storage means for separately storing the condition values produced by a successive plurality of instructions of said first type into respectively different condition value fields; and condition testing means for separately testing the condition values in said multiple condition value fields responsive to a respective multiple instructions of said second type;

instruction evaluation means for evaluating, at run time, each of said instructions of said first type and each of said instructions of said second type to prevent contention among any of said evaluated instructions which are attempting to access any one of said plurality of condition value fields.

6. The condition handling apparatus set forth in claim 5, further comprising:

means for combining a plurality of said separately stored condition values to generate a further condition value for storage by said condition storage means.

7. The condition handling apparatus set forth in claim 5, wherein:

said computer system includes first and second processing stages each of which executes instructions of said first and second type and each of which is coupled to said condition storage means and to said condition testing means;

said condition storage means includes means for storing condition values produced by instructions of said first type which are executed by said first and second processing stages into respective first and second ones of said condition value fields; and said condition testing means includes means for testing condition values stored in said first and second condition value fields in response to instructions of said second type which are executed by said first and second processing stages, respectively.

8. The condition handling apparatus set forth in claim 5, wherein said computer system includes a pipeline processor coupled to said condition storage means and to said condition testing means which overlaps the execution of an instruction of said second type that tests a condition value in a first one of said multiple condition value fields with the execution of an instruction of said first type that sets a condition value in a second one of said multiple condition value fields.

* * * * *